June 17, 1930.   H. L. POPE   1,764,643
REFRIGERATOR LINING
Filed May 2, 1927
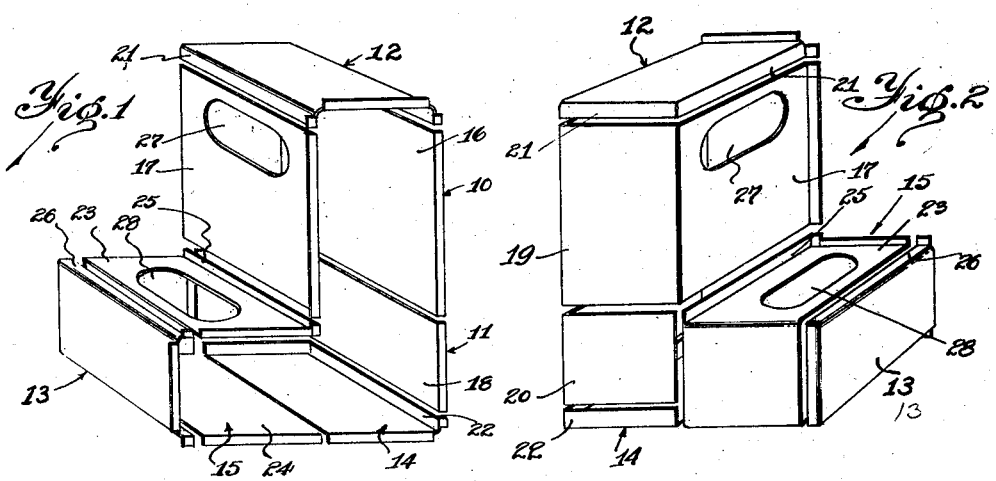
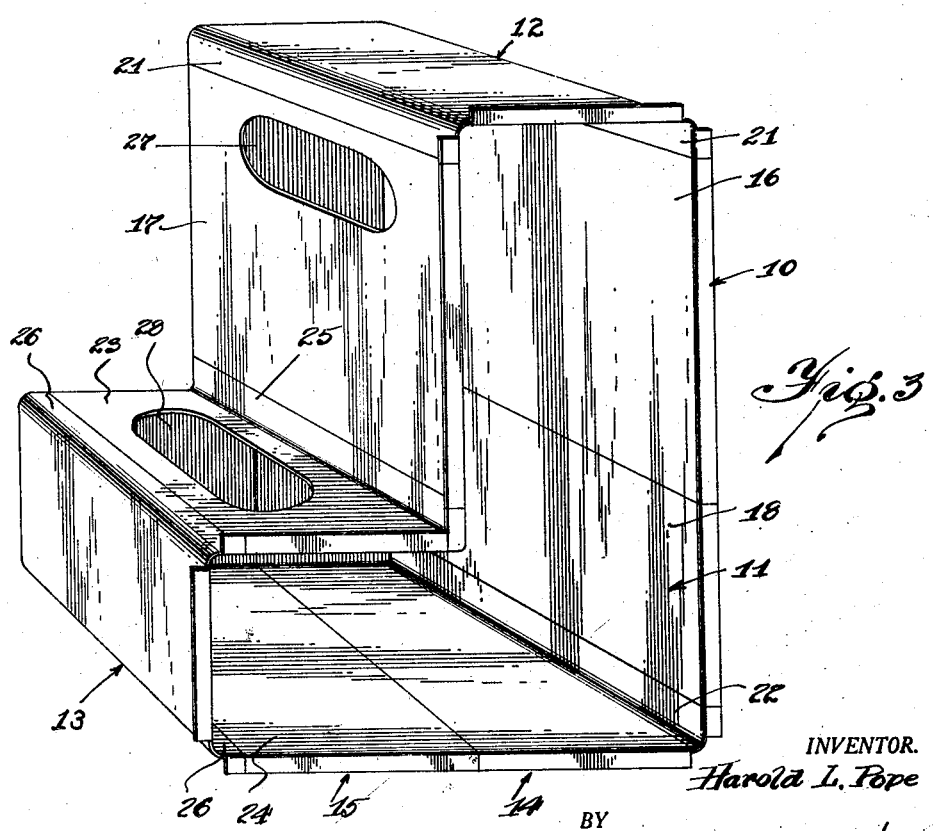
INVENTOR.
Harold L. Pope
BY
Wayne M. Hart.
ATTORNEY.

Patented June 17, 1930

1,764,643

UNITED STATES PATENT OFFICE

HAROLD L. POPE, OF GRAND RAPIDS, MICHIGAN, ASSIGNOR TO KELVINATOR CORPORATION, OF DETROIT, MICHIGAN, A CORPORATION OF MICHIGAN

REFRIGERATOR LINING

Application filed May 2, 1927. Serial No. 188,279.

This invention relates generally to refrigerator cabinets and is especially related to improved unitary lining structures therefor and to an improved method of manufacturing such linings.

It has been found very advantageous to employ unitary lining structures in the better grade of refrigerators, eliminating joints which might spread and permit moisture to penetrate into the interior wall structure or permit cork dust to filter through into the food chambers. It has been customary to construct these lining structures by hand welding a plurality of lining sections together by means of an oxy-acetylene torch, and though these hand welded structures have proved satisfactory to a large extent, they are expensive to construct on account of the large amount of manual labor involved also, it is impossible to eliminate the human element, and thus the completed lining is subject to more or less variation in construction which in some instances results in the concentration of strains at undesirable points. Furthermore, this hand welded operation is a relatively slow process, and consequently, the production schedule can only be maintained by employing a considerable number of welders who, in turn, occupy valuable floor space. Consequently this method is found to be disadvantageous because of the uneconomical employment of expensive and expert labor and the uneconomical use of valuable floor space necessary to maintain the required factory production.

One object of my present invention consists in providing an improved refrigerator lining of the type in which a plurality of punched and formed sheet metal lining sections are joined together to form a unitary lining structure by butt welding the said refrigerator lining sections together and without sacrificing quality or any of the advantages possessed by the previous type of structure.

A further object of my invention is to increase manufacturing economy and efficiency, by providing improved manufacturing methods for more speedily welding a plurality of refrigerator lining sections together to form a completed unitary refrigerator lining structure of uniform construction.

For a more detailed understanding of my invention reference may now be had to the accompanying drawing which illustrates one form which my invention may assume and in which:

Fig. 1 is an exploded perspective view of a lining structure showing the several lining sections assembled together but slightly spaced from each other.

Fig. 2 is a similar perspective view of the opposite side of the lining structure illustrated in Fig. 1.

Fig. 3 is a perspective view similar to Fig. 1, looking at the front of the lining structure and showing the several lining sections welded together.

My improved unitary lining structure is composed of a plurality of separate sheet metal panels which are cut and pressed into shape to form horizontally and vertically disposed lining sections, which are adapted to be welded together. The vertically alined lining sections are designated 10, 11, and 12, and the horizontally alined lining sections are designated by the reference characters 13, 14 and 15, all of these lining sections being of such shape and dimensions as to permit of perfect alinement with the other portions.

The section 10 is pressed into a substantially U-shape, one leg 16 thereof forming a part of the exterior wall of the large food chamber and another leg 17 forming the partition wall which divides the food chamber from the cooling chamber of the refrigerator. The section 11 is disposed immediately below the section 10 and is pressed into substantially L-shape, one leg 18 thereof adjoining the leg 16 of section 10 and forming a continuation of the exterior wall of the large food chamber. The rear wall of the food chamber is formed by adjoining portions 19 and 20 of the sections 10 and 11, respectively. The top and bottom walls of the large food chamber are formed by the sections 12 and 14 respectively, the section 12 which forms the top wall being provided with a downwardly extended flange portion 21 on three sides adapted to abut the upper rim of the section 10, and the section 14 is provided on two sides thereof with an upwardly extending flange portion 22 adapted to abut against the lower edge of the L-shape section 11.

The remainder of the lining structure defines a small food chamber and is composed of the horizontally alined sections 13 and 15. The section 15, which is of substantially U-shape, is provided with upper and lower horizontally disposed legs 23 and 24, respectively. The lower horizontal leg 24 is adapted to abut the edge of the section 14 and forms therewith a continuous wall serving as the bottom of the food chambers. The upper horizontal leg 23 is provided along one side with an upwardly extending flange portion 25 arranged to abut the lower edge of the partition wall formed by the leg portion 17 of the lining section 10. The end section 12 is provided with laterally disposed flange portions 26 arranged to abut the outside edges of the section 15.

With the arrangement of lining sections above described, it will be seen that when these sections are assembled together they define a refrigerator lining structure of substantially L-shape. The vertical wall section 17 is provided with a relatively large opening 27 and the horizontal wall section 23, which forms the top of the small food chamber, is also provided with a relatively large opening 28. These openings serve to place the respective food chambers in open communication with the cooling chamber of the refrigerator, so as to permit a continuous circulation of chilled air from the cooling chamber therethrough.

These several separate lining sections are so constructed and arranged that they may be brought together edge to edge and butt welded together, by any suitable butt welding machine provided with clamping means for correctly positioning and alining said sections with respect to each other. Pressure is applied to force the abutting edges of said sections together, and a heavy electrical current is passed across the joint between adjoining sections, thus butt-welding these sections together. It will be seen that I have thus provided a unitary lining structure which is composed of a plurality of lining sections that may be uniformly butt welded together by the use of any suitable designed butt welding machine.

This improved method of manufacture also greatly reduces the cost of manufacturing because the lining sections are instantly welded, the production speeded up, thus permitting the manufacturer to maintain his production schedule with a fewer number of operators, the completed are uniform, and the stresses in similar portions thereof are equal.

Because of the fewer number of welding units needed to maintain the required production schedule, less floor space is needed in the factory for welding purposes.

Although I have illustrated but one form of my invention and have described in detail but a single application thereof, it will be apparent to those skilled in the art, that various modifications and changes may be made therein without departing from the spirit of my invention or from the scope of the appended claims.

What I claim is:

1. A refrigerator lining comprising two members of substantially U-shape in cross-section disposed at an angle to each other and having the side edge of one leg of one of said members secured to the side edge of one leg of the other member, a substantially rectangular member secured to the three side edges of each of said U-shape members, a member of substantially L-shape in cross-section having one edge of one leg secured to the side edge of one leg one of said U-shape members and the corresponding edge of the other leg secured to the central portion of said U-shape member and having the end edge of one of said legs secured to the edge of the central portion of the other U-shape member, and a substantially rectangular member secured along two edges to one edge of both legs of the L-shape member, and having one edge secured to the remaining side edge of one of the U-shape members.

2. A refrigerator lining comprising two members of substantially U-shape in cross-section disposed at an angle to each other and having the side edge of one leg of one of said members secured to the side edge of one leg of the other member, a substantially rectangular dished member secured to the three side edges of each of said U-shape members, a member of substantially L-shape in cross-section having one edge of one leg secured to the side edge of one leg of one of said U-shape members and the corresponding edge of the other leg secured to the central portion of one of said U-shape member and having the end edge of said legs secured to the edge of the central portion of the other U-shape member, and a substantially rectangular dished member secured along two edges to one edge of both legs of the L-shape member, and having one edge secured to the remaining side edge of one of the U-shape members, all of said members being composed of sheet metal.

In testimony whereof I hereunto affix my signature.

HAROLD L. POPE.